United States Patent [19]
Maki et al.

[11] Patent Number: 4,973,108
[45] Date of Patent: Nov. 27, 1990

[54] ANTI-LOCK CONTROL DEVICE FOR AIR-OVER HYDRAULIC BRAKE SYSTEM

[75] Inventors: Takao Maki, Saitama; Tomohiro Fujita, Hanyu, both of Japan

[73] Assignee: Akebono Brake Industry Co., Ltd., Tokyo, Japan

[21] Appl. No.: 375,942

[22] Filed: Jul. 6, 1989

[30] Foreign Application Priority Data

Aug. 2, 1988 [JP]  Japan .................. 63-193143

[51] Int. Cl.⁵ .................................. B60T 8/32
[52] U.S. Cl. ............................. 303/115; 303/119; 303/DIG. 3; 303/DIG. 4
[58] Field of Search ............... 303/113, 115, 118, 119, 303/DIG. 5, 1–4; 188/181 A, 151 A

[56] References Cited

U.S. PATENT DOCUMENTS

| | | | |
|---|---|---|---|
| 3,556,610 | 1/1971 | Leiber | 303/119 X |
| 3,597,012 | 8/1971 | Packer et al. | 303/115 |
| 3,674,317 | 7/1972 | Mangold | 303/118 |
| 3,726,568 | 4/1973 | Krugler, Jr. | 303/115 |
| 3,731,980 | 5/1973 | Fink et al. | 303/119 |
| 3,752,537 | 8/1973 | Ochiai | 303/115 |
| 3,754,795 | 8/1973 | Von Lowis et al. | 303/115 |
| 3,843,212 | 10/1974 | Skoyles | 303/115 |
| 3,950,035 | 4/1976 | Tribe | 303/118 |
| 4,035,034 | 7/1977 | Sekiguchi | 303/119 X |
| 4,095,851 | 6/1978 | Ando et al. | 303/119 X |
| 4,099,793 | 7/1978 | Iio | 303/119 X |
| 4,179,166 | 12/1979 | Sharp et al. | 303/119 |
| 4,715,664 | 12/1987 | Nakanishi et al. | 303/119 X |
| 4,765,692 | 8/1988 | Miyake | 303/119 |
| 4,889,395 | 12/1989 | Fujita et al. | 303/113 X |

FOREIGN PATENT DOCUMENTS

51-1824  1/1976  Japan .

*Primary Examiner*—Douglas C. Butler
*Attorney, Agent, or Firm*—Oliff & Berridge

[57] ABSTRACT

An anti-lock control device of a hydraulic brake system which enables a rapid building up of braking hydraulic pressure during normal braking but, once an anti-lock control is commenced, reduces the rise of the recovery of the braking hydraulic pressure so as to optimize the same for anti-lock control. The hydraulic braking system having a pneumatic pressure source, a brake valve, converting device for receiving the pneumatic pressure supplied from the pneumatic pressure source through the brake valve and converting the received pneumatic pressure into braking hydraulic pressure, wheel cylinders for receiving the braking hydraulic pressure, and pneumatic pressure control valves for controlling the pneumatic pressure in a pneumatic pressure chamber of the converting means so as to control the braking hydraulic pressure. The anti-lock control device has a comparator for comparing the pneumatic pressure in the pneumatic pressure chamber with the output pneumatic pressure of the brake valve, and an orifice valve which is put into a passage of pressurized air between the brake valve and the pneumatic pressure control valves when the comparator has judged that the pneumatic pressure in the pneumatic pressure chamber has come down below the output pneumatic pressure of the brake valve by a predetermined value. The orifice valve reduces the rate of rise of the pneumatic pressure in the pneumatic chamber so as to correspondingly reduce the rate of increase of the braking hydraulic pressure.

7 Claims, 4 Drawing Sheets

ANTI-LOCK CONTROL DEVICE FOR AIR-OVER HYDRAULIC BRAKE SYSTEM

BACKGROUND OF THE INVENTION

The present invention relates to an anti-lock control device for use in an air-over hydraulic braking system.

Anti-lock control devices for use in air-over hydraulic braking systems are disclosed, for example, in the specification of United States Patent Appln. Ser. No. 07/317,846 now U.S. Pat. No. 4,889,395 and in Japanese Patent Examined Publication No. 1824/1976.

Detailed description will be given of the above-mentioned known devices, with specific reference to FIGS. 5 and 6, Referring first to FIG. 5, a known braking system has a brake valve 2 connected to a pneumatic pressure source 1. The control device also has an air master cylinder 3 which is equipped with a pneumatic chamber 3a connected to the brake valve 2 and also with a hydraulic pressure chamber 3d which is connected through a modulator 4 to wheel cylinders 5 only one of which is shown. The modulator 4 has a pneumatic chamber 4a which is connected to the brake valve 2 through a normally-opened hold valve 7 which serves as a pneumatic pressure control valve. The pneumatic chamber 4a of the modulator 4 also is communicated with the atmosphere through a normally-closed decay valve 8 which also serves as a pneumatic pressure control valve.

In normal braking operation, as the brake valve 2 is opened, the pneumatic pressure which has been applied to the pneumatic chamber 3a of the air master cylinder 3 is converted into hydraulic pressure which is applied to wheel cylinders 5 through the modulator 4 so as to brake the wheels. When locking of wheel is going to occur during the braking, the hold valve 7 is closed while the decay valve 8 is opened so that the pneumatic pressure in the pneumatic chamber 4a of the modulator 4 is reduced so that the pneumatic piston 4b in the modulator is moved. In consequence, the hydraulic piston 4c connected to the pneumatic piston 4b is moved so as to close the control valve 10 provided in the fluid passage in the modulator 4 while increasing the volume of the hydraulic pressure chamber 4d so that the brake fluid pressure in the wheel cylinders is relieved into the hydraulic pressure chamber 4d so that the braking pressure is reduced to prevent the wheels from being locked. When the wheel lock is avoided, the decay valve 8 is closed and the hold valve 7 is opened so that the pneumatic pressure from the pneumatic source 1 is introduced into the pneumatic pressure chamber of the modulator 4 so that the pneumatic piston 4b and, hence, the hydraulic piston 4c are moved to reduce the volume in the hydraulic pressure chamber 4d. In consequence, the braking hydraulic pressure is recovered and applied to the wheel cylinders so as to brake the wheels.

Referring now to FIG. 6, another known braking system has an air master cylinder 3 provided with a pneumatic pressure chamber 3a which is connected to a pneumatic pressure source 1 through a brake valve 2 and a normally-opened hold valve 7 which serves as the pneumatic pressure control valve. The air master cylinder 3 also has a hydraulic pressure chamber 3d connected to wheel cylinders 5. The pneumatic pressure chamber 3a of the air master cylinder 3 is opened to atmosphere through a normally-closed decay valve 8 which functions as a pneumatic pressure control valve.

In normal braking operation, the brake valve 2 is opened so that the pneumatic pressure applied to the pneumatic pressure chamber 3a of the air master cylinder 3 is converted into hydraulic pressure which is applied to wheel cylinders 5 thereby producing braking effect. When anti-lock control is necessary, the hold valve 7 is closed while the decay valve 8 is opened so that the pressure in the pneumatic pressure chamber 3a of the air master cylinder 3 is reduced, with the result that a pneumatic piston 3b in the air master cylinder 3 is moved. In consequence, a hydraulic piston 3c connected to the pneumatic piston 3b is moved so as to increase the volume of the hydraulic pressure chamber 3d so that the braking hydraulic pressure is relieved into the hydraulic pressure chamber 3d whereby the braking effort is reduced to avoid locking of wheels. When wheel lock is avoided, the decay valve 8 is closed while the hold valve 7 is opened so that the air pressure from the pneumatic pressures source is introduced into the pneumatic pressure chamber 3a of the air master cylinder 3 so that the pneumatic piston 3b and, hence, the hydraulic piston 3c are moved so as to decrease the volume of the hydraulic pressure chamber 3d, so that the braking hydraulic pressure is recovered and applied to the wheel cylinders 5 thereby to put the brake again into effect.

In these known systems, the recovery of the hydraulic braking pressure after an anti-lock control operation, i.e., the rate at which the hydraulic braking pressure rises to produce the braking effect again, is the same as that in the ordinary braking operation.

In general, however, anti-lock control operation is effected when the wheels are rolling on a slippery road, i.e., when the vehicle is running on a road the surface of which is liable to cause a lock of wheels. From this point of view, the recovery of the braking hydraulic pressure need not be done at the same rate as the building up of the braking hydraulic pressure in ordinary braking operation. Rather, the recovery of the braking hydraulic pressure after an anti-lock braking operation is preferably conducted with a smaller rate.

SUMMARY OF THE INVENTION

Accordingly, it is an object of the present invention to provide an anti-lock control device for use in a hydraulic braking system which is improved in such a way that the braking hydraulic pressure is allowed to quickly rise during normal braking operation but, once anti-lock control operation is commenced, the rate of rise of the braking hydraulic pressure after each cycle of anti-lock braking operation is reduced to a level which is suitable for the anti-lock braking.

To this end, according to the present invention, there is provided an anti-lock control device of an air-over hydraulic braking system having a pneumatic pressure source, a brake valve, converting means for receiving the pneumatic pressure supplied from the pneumatic pressure source through the brake valve and converting the received pneumatic pressure into braking hydraulic pressure, wheel cylinders for receiving the braking hydraulic pressure, and pneumatic pressure control valves for controlling the pneumatic pressure in a pneumatic pressure chamber of the converting means so as to control the braking hydraulic pressure, the anti-lock control device comprising: comparator means for comparing the pneumatic pressure in the pneumatic pressure chamber with the output pneumatic pressure of the brake valve 2; and an orifice valve which is put into a passage of pressurized air between the brake valve and the pneumatic pressure control valves when the comparator means has judged that the pneumatic pressure in the pneumatic pressure chamber has come down below the output pneumatic pressure of the brake valve by a predetermined value.

The anti-lock control device of the present invention may be constructed such that the pneumatic pressure chamber of an air master cylinder is connected to a brake valve which in turn is connected to the pneumatic pressure chamber of an air master cylinder which also has a hydraulic pressure chamber connected through a modulator to the wheel cylinders, the brake valve also connected through the pneumatic pressure control valve to the pneumatic pressure chamber of the modulator so that the modulator is operated by pneumatic pressure applied thereto through the pneumatic pressure control valve, thereby controlling the braking hydraulic pressure acting in the wheel cylinders, thus realizing a construction similar to the arrangement shown in FIG. 5. In such a case, the pneumatic pressure chamber 4a of the modulator 4 serves as the pneumatic pressure chamber of the anti-lock control device.

Namely, the above-mentioned comparator means compares the pneumatic pressure in the pneumatic pressure chamber of the modulator with the output pneumatic pressure of the brake valve. When the comparison has proved that the pneumatic pressure in the pneumatic pressure chamber has come down below the output pneumatic pressure of the brake valve by a predetermined value, the above-mentioned orifice valve is put into the passage between the brake valve and the pneumatic control valve.

The anti-lock control device of the invention also may be constructed such that the pneumatic pressure chamber of the air master cylinder is connected to the pneumatic pressure source through the brake valve and the pneumatic pressure control valve, so that the braking hydraulic pressure acting in the hydraulic pressure chamber of the air master cylinder is controlled as a result of control of the pneumatic pressure in the pneumatic pressure chamber of the air master cylinder by means of the pneumatic pressure control valve, thus realizing a construction similar to that of the arrangement shown in FIG. 6. In such a case, the pneumatic pressure chamber 3a of the air master cylinder 3 serves as the pneumatic pressure chamber in the anti-lock control device of the present invention.

Namely, the comparator means compares the pneumatic pressure in the pneumatic pressure chamber of the air master cylinder with the output pneumatic pressure of the brake valve, and the orifice valve is put into the passage between the brake valve and the pneumatic pressure control valve when the result of the comparison has proved that the pneumatic pressure in the pneumatic pressure chamber has come down below the output pneumatic pressure of the brake valve by a predetermined value.

Various types of device can be used as the comparator means such as a differential pressure piston which is moved in accordance with the difference between the pressures acting on both ends thereof, pressure sensors capable of sensing both pneumatic pressures to be compared, and so forth. In a preferred embodiment, the comparator means 15 includes pressure sensors P capable of sensing the pneumatic pressure in the pneumatic pressure chamber 3a or 4a and the output pneumatic pressure of the brake valve 2, respectively, and means for comparing the pressure values sensed by said pressure sensors.

When a differential pressure piston is used as the comparator means, the orifice valve may be connected to the differential pressure chamber through a rod so that the orifice valve is moved into and out of the passage of the pressurized air in accordance with the movement of the differential pressure chamber. The arrangement also may be such that the orifice valve is solenoid-actuated valve associated with a sensor such as a switch capable of detecting the position of the differential pressure piston so that the solenoid is activated in accordance with a signal from the sensor so as to put the orifice valve into and out of the passage of the pressurized air. The solenoid-actuated orifice valve also is usable when the comparator means is composed of a pair of sensors, such that the orifice valve is put into the pressurized air passage when the difference between the pressures sensed by both sensors has reached a predetermined value.

DESCRIPTION OF THE PREFERRED EMBODIMENTS

The invention will be more fully understood from the following description of the preferred embodiments.

First Embodiment

Figure 1:
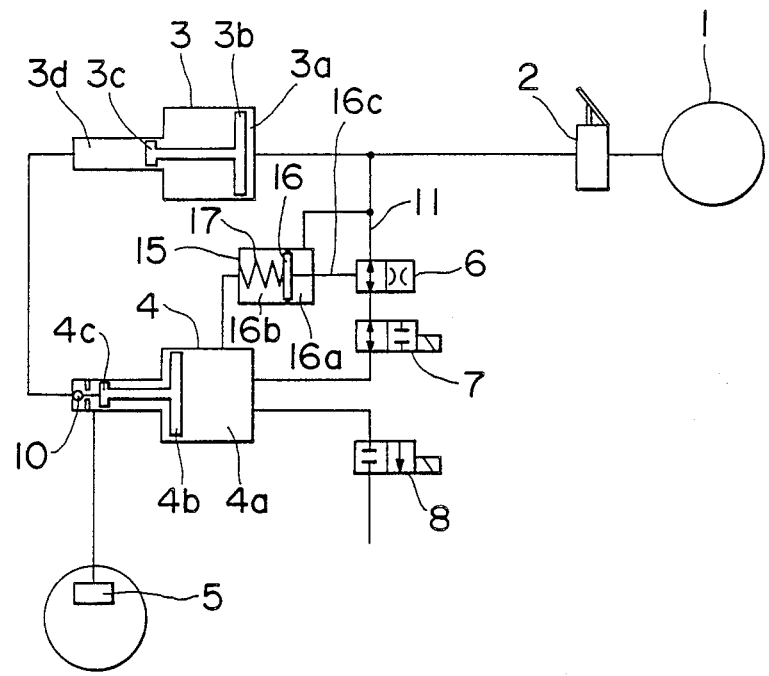
FIG. 1 is a schematic illustration of a hydraulic braking system incorporating an embodiment of the anti-lock control device of the present invention.

Referring to FIG. 1 showing a first embodiment, a pneumatic pressure source 1 is connected through a brake valve 2 to a pneumatic pressure chamber 3a of an air master cylinder 3 which has a pneumatic piston 3b and a hydraulic piston 3c operatively connected to the pneumatic piston 3b. The arrangement is such that the pneumatic piston 3b is displaced by the pneumatic pressure from the pneumatic pressure source 1 so as to move the hydraulic piston 3c thereby generating a hydraulic pressure in a hydraulic chamber 3d in the air master cylinder 3. The pneumatic pressure chamber 3d of the air master cylinder 3 is connected to wheel cylinders 5 through a hydraulic pressure chamber 4d of a modulator 4.

The modulator 4 has a pneumatic pressure chamber 4a which is connected to the brake valve 2 through an orifice valve 6 and a normally-opened hold valve 7 which serves as a pneumatic pressure control valve. The pneumatic pressure chamber 4a of the modulator 4 also is connected to a passage which has a normally-closed decay valve 8 serving as a pneumatic pressure control valve and which is opened to the atmosphere.

Figure 2:
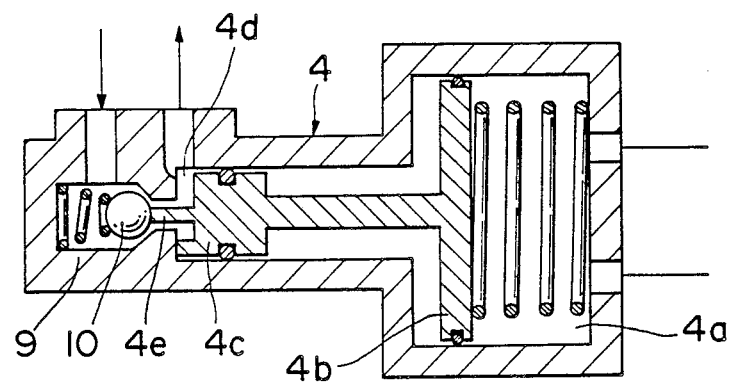
FIG. 2 is a sectional view showing the detail of a modulator valve of the present invention.

As shown in FIG. 2, the modulator 4 is provided with a pneumatic piston 4b which receives the pressure in the pneumatic pressure chamber 4a and a hydraulic piston 4c which receives the pressure in a hydraulic chamber 4d, the pneumatic piston 4b and the hydraulic piston 4c being connected to each other. A ball valve 10 which is urged by a spring 9 in closing direction is provided in a liquid passage connected to the hydraulic pressure chamber 4d. The ball valve 10 is adapted to be moved in the opening direction against the force of the spring 9, when pushed by a rod 4e which projects from the hydraulic piston 4c.

An actuator 15 of a type employing differential pressure piston is provided between the pneumatic pressure chamber 4a of the modulator 4 and a portion of a pressurized air passage 11 between the orifice valve 6 and the pneumatic pressure source 1. The actuator 15 constitutes comparison means which constitutes an essential portion of the anti-lock control device of the invention. More specifically, the actuator 15 has a differential pressure piston 16 on one side of which is defined a pressure chamber 16a which is connected to the portion of the pressurized air passage 11 between the orifice valve 6 and the pneumatic pressure source 1. Another pressure chamber 16b formed on the other end of the differential pressure piston 16 is connected to the pneumatic pressure chamber 4a of the modulator 4. Thus, the pressure chambers 16a and 16b on both ends of the differential pressure piston 16 receive the output pneumatic pressure from the brake valve 2 and the pressure in the pneumatic chamber 4a of the modulator, respectively, so that the differential pressure piston 16 is moved in accordance with the pressure differential between these pressures. The differential pressure piston 16 has a rod 16c projecting therefrom and engaging with the orifice valve 6 so that the orifice valve 6 can be brought into and out of the pressurized air passage 1 in accordance with the movement of the differential pressure piston 16. More specifically, the pressure differential piston 16 is normally biased by the spring 17 so as to keep the orifice valve 6 out of the air passage 11. However, when the pneumatic pressure in the pneumatic pressure chamber 4a of the modulator 4 has become lower than the output pneumatic pressure of the brake valve 2, the differential pressure piston 16 is moved to the left as viewed in the drawings against the force of the spring 17 and, when the pressure differential has reached a predetermined value, the orifice valve 6 is brought into the passage 11 of the pressurized air.

In this embodiment, the differential piston 16 is urged by the spring 17 so that the value of the pressure differential across the differential pressure 16 at which the orifice valve 6 is brought into the passage 11 of the pressurized air is determined by the stiffness of the spring 17.

Although not shown, the vehicle incorporating the described system has wheel speed sensors associated with the respective wheels. The vehicle also has an electronic control unit ECU which determines whether there is any risk for wheel lock to occur on the basis of the wheel speed data derived from these wheel speed sensors and selectively opens and close the hold valve 7 and the decay valve 8 in accordance with the result of the determination.

The operation of this embodiment is as follows.

During normal running of the vehicle, the orifice valve 6 is kept away from the pressurized air passage 11 so that the hold valve 7 and the decay valve 8 are opened and closed, respectively.

When the driver has stepped down the brake pedal, the brake valve 2 is opened so that the pneumatic pressure from the pneumatic pressure source 1 is directly introduced to the pneumatic pressure chamber 3a of the air master cylinder 3 as the output pneumatic pressure of the brake valve 2, and the thus applied pneumatic pressure is converted into hydraulic pressure in the air master cylinder 3. At the same time, the pneumatic pressure from the pneumatic pressure source 1 is delivered to the pneumatic chamber 4a of the modulator 4 through the hold valve 7 so that the pneumatic piston 3b is moved to the left to keep the ball valve 10 open. In consequence, the braking hydraulic pressure generated in the air master cylinder 3 is transmitted through the opened ball valve 10 to wheel cylinders 5, thereby putting the brake into effect.

When the ECU has judged that wheel lock is likely to occur, it produces instructions for closing and opening the hold valve 7 and the decay valve 8, respectively. In consequence, the pressure in the pneumatic pressure chamber 4a of the modulator 4 is reduced to allow the pneumatic piston 3b of the modulator 4 to move to the right as viewed in the drawings thereby to close the ball valve 10. In consequence, the braking hydraulic pressure in the wheel cylinder 5 is relieved into the hydraulic pressure chamber 4d of the modulator 4, thereby avoiding occurrence of wheel lock.

The reduction in the pressure in the pneumatic pressure chamber 4a of the modulator 4 causes the pressure balance across the differential pressure piston 16 of the actuator 15 to be broken. In consequence, the differential pressure piston 16 is moved to the left as viewed in the drawings by the output pneumatic pressure of the brake valve 2, so that the orifice valve 6 engaging with the rod 16c is brought into the passage 11 of the pressurized air.

Therefore, when the pneumatic pressure in the pneumatic pressure chamber 4a of the modulator 4 is raised again so as to recover the braking hydraulic pressure through opening and closing of the ball valve 7 and the decay valve 8, respectively, the rate of the rise of the pneumatic pressure in the pneumatic chamber 4a is small because of the presence of the orifice valve 6 in the pressurized air passage 11 so that the rate of rise of the braking hydraulic pressure in the hydraulic chamber 4d is correspondingly small. This operation is repeated cyclically for a plurality of times.

The pneumatic pressure control valve may be a three-way valve in which the hold valve 7 and the decay valve 8 are constructed as a unit with each other.

Figure 7:
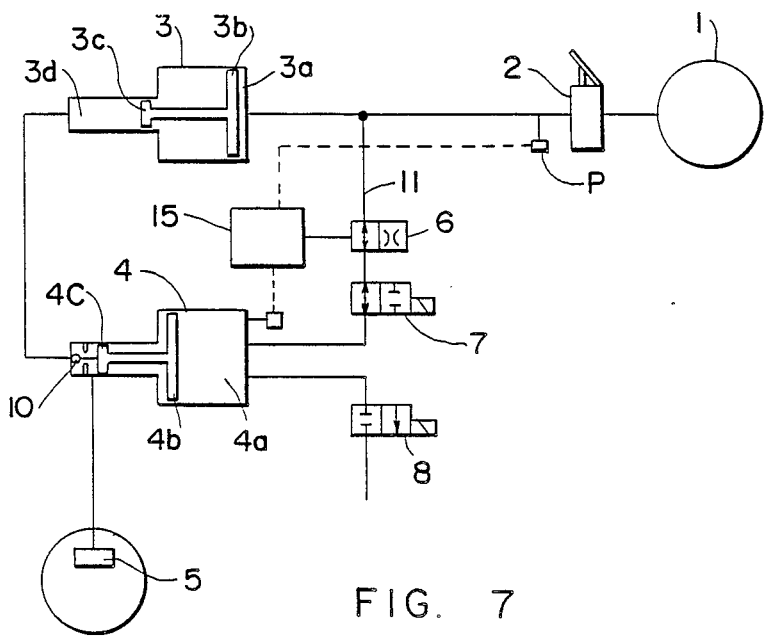
FIG. 7 is a schematic illustration of a hydraulic braking system incorporating pressure sensors.

FIG. 7 is a similar to the embodiment shown in FIG. 1, further showing pressure sensors P capable of sensing pneumatic pressure in a pneumatic pressure chamber 3a or 4a and the output pneumatic pressure of a brake valve, respectively.

Second Embodiment

A second embodiment of the present invention will be described hereinafter.

Briefly, the second embodiment has a construction similar to that of the first embodiment, but the modulator 4 is omitted from the arrangement of the first embodiment. The pneumatic air chamber 3a of the air master cylinder 3 is connected to the pneumatic pressure source 1 through the brake valve 2 and the hold valve 7 which serves as a pneumatic pressure control valve. The pneumatic pressure chamber 3a is connected to a passage which leads to the atmosphere through a decay valve 8 which also serves as the pneumatic pressure control valve.

In normal braking operation, the pneumatic pressure from the pneumatic pressure source 1 is applied through the brake valve 2 to the pneumatic pressure chamber 3a of the master cylinder 3 and is converted into hydraulic pressure which is directly transmitted to the wheel cylinders 5.

When anti-lock control is conducted, the hold valve 7 is closed and the decay valve 8 are opened so that the pneumatic pressure in the pneumatic pressure chamber 3a of the air master cylinder 3 is reduced, with the result that the pneumatic piston 3b of the air master cylinder 3 is displaced to the right as viewed in the drawings, with the result that the braking hydraulic pressure in the wheel cylinder 5 is relieved into the hydraulic pressure chamber 3d of the air master cyinder 3, thereby to avoid occurrence of wheel lock.

The balance of pressure across the differential pressure piston 16 of the actuator is lost as a result of the reduction in the pressure in the pneumatic pressure chamber 3a of the air master cylinder 3 so that the differential pressure piston 16 is moved to the left as viewed in the drawings. In consequence, the rod 16c of the differential pressure piston 16 drives the orifice valve 16 into the passage 11 of the pressurized air.

When the pneumatic pressure in the pneumatic pressure chamber 3a of the air master cylinder 3 is raised again to recover the braking hydraulic pressure, the rate of rise of the pneumatic pressure in the pneumatic pressure chamber 3a is small because of the presence of the orifice valve 6 in the pressurized air passage 11, with the result that the rate of rise of the braking hydraulic pressure in the hydraulic pressure chamber 3d is correspondingly small. This operation is repeated several times as required to safely brake the vehicle.

Figure 3:
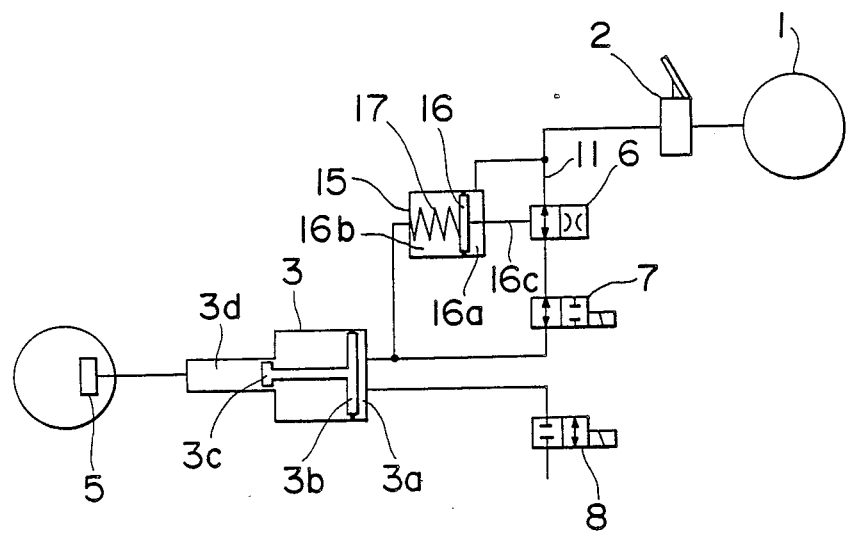
FIG. 3 is a schematic illustration of a hydraulic braking system incorporating a second embodiment of the anti-lock control device of the present invention.
Figure 8:
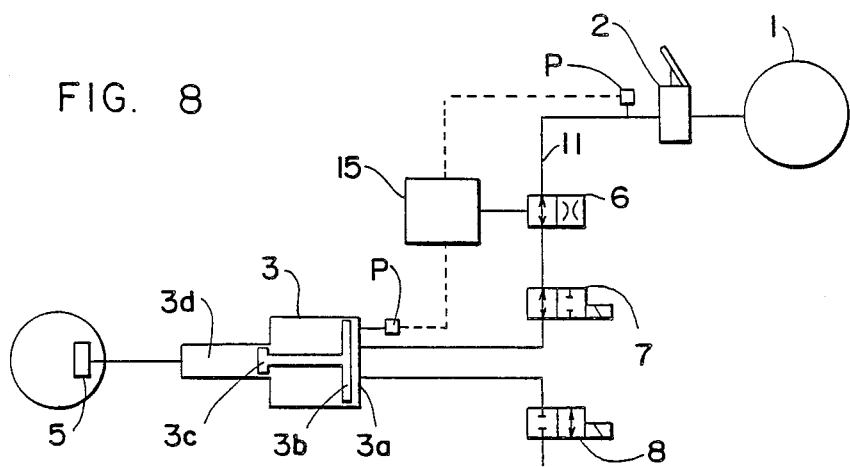
FIG. 8 is a schematic illustration of a hydraulic braking system incorporating pressure sensors.

FIG. 8 is similar to the embodiment shown in FIG. 3, and further shows pressure sensors P capable of sensing pneumatic pressure in a pneumatic pressure chamber 3a or 4a and the output pneumatic pressure of a brake valve, respectively.

Other Embodiment

Figure 4:
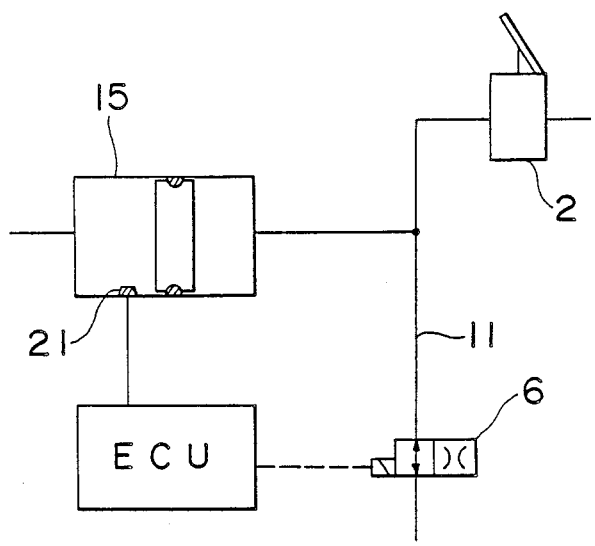
FIG. 4 is an illustration of an essential portion of a different embodiment.
Figure 5:
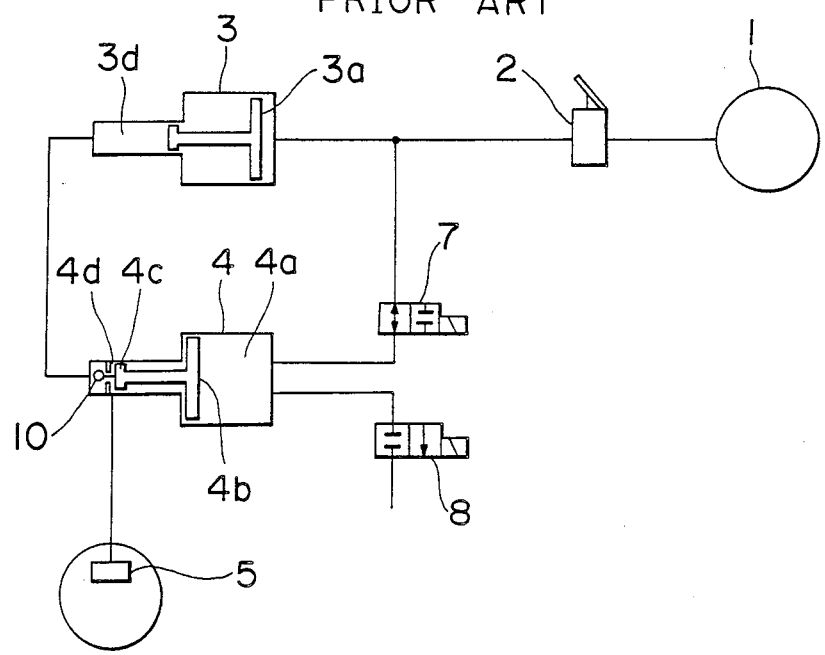
FIG. 5 is a schematic illustration of a first known hydraulic braking system.
Figure 6:
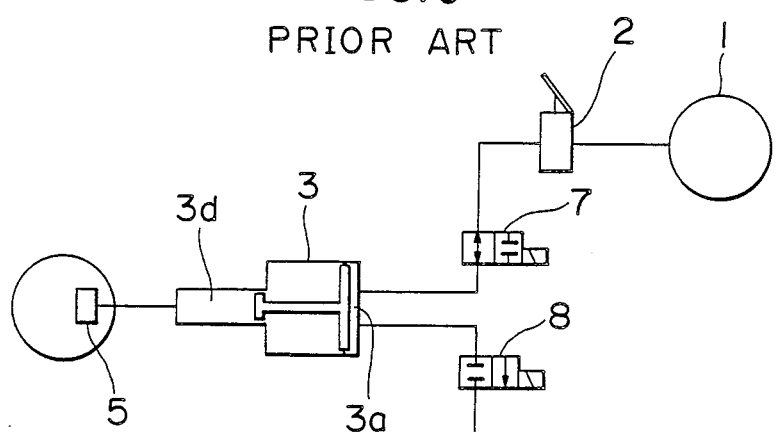
FIG. 6 is a schematic illustration of a second known hydraulic braking system.

FIG. 4 shows a different embodiment in which the position of the differential pressure piston 16 is detected by a switch 21. Upon receipt of a detection signal from the switch 21, the ECU produces an instruction for activating a solenoid-actuated orifice valve 6 to put the same into the pressurized air passage 11.

As has been described, according to the present invention, the braking hydraulic pressure is quickly built up in normal braking operation. However, once anti-lock control is commenced, the rate of recovery of the braking hydraulic pressure is reduced so as to enable an appropriate brake control.

What is claimed is:

1. An anti-lock control device of an air-over hydraulic braking system having a pneumatic pressure source, a brake valve, converting means for receiving the pneumatic pressure supplied from said pneumatic pressure source through said brake valve and converting the received pneumatic pressure into braking hydraulic pressure, wheel cylinders for receiving said braking hydraulic pressure, and pneumatic pressure control valves for controlling the pneumatic pressure in a pneumatic pressure chamber or 4a of said converting means so as to control said braking hydraulic pressure, said anti-lock control device comprising:

comparator means for comparing the pneumatic pressure in said pneumatic pressure chamber with the output pneumatic pressure of said brake valve; and an orifice valve into which flows a passage of pressurized air between said brake valve and said pneumatic pressure control valves when said comparator means has judged that the pneumatic pressure in said pneumatic pressure chamber has come down below the output pneumatic pressure of said brake valve by a predetermined value.

2. An anti-lock control device according to claim 1, wherein said pneumatic pressure control valves are a normally-opened hold valve and a normally-closed decay valve.

3. An anti-lock control device according to claim 1, wherein said comparator means includes pressure sensors capable of sensing said pneumatic pressure in said pneumatic pressure chamber and the output pneumatic pressure of said brake valve, respectively, and means for comparing the pressure values sensed by said pressure sensors.

4. An anti-lock control device according to claim 1, wherein said comparator means includes an actuator having a differential pressure piston which receives at its both ends said pneumatic pressure in said pneumatic pressure chamber and said output pneumatic pressure of said brake valve, said differential pressure piston being adapted to be moved in accordance with the difference between the pressures received at its both ends.

5. An anti-lock control device according to claim 4, wherein said orifice valve is a solenoid-actuated valve and said actuator has a switch for detecting the position of said differential pressure piston and for delivering a signal representative of the position of said differential pressure piston to an electronic control unit which produces a signal for activating said orifice valve to move it into said passage between said brake valve and said pneumatic pressure control valves.

6. An anti-lock control device according to claim 4, wherein said differential pressure piston of said actuator has a rod which engages with said orifice valve so as to move said orifice valve into said passage between said brake valve and said pneumatic pressure control valves in accordance with the movement of said differential pressure piston.

7. An anti-lock control device according to claim 6, wherein said differential pressure piston is normally urged by a spring so as to keep said orifice valve from said passage between said brake valve and said pneumatic pressure control valves so that the value of the pressure difference acting on said differential pressure piston at which said orifice valve is brought into said passage between said brake valve and said pneumatic pressure control valves is determined by the spring constant of said spring.

* * * * *